(12) United States Patent
Hughes et al.

(10) Patent No.: US 8,714,248 B2
(45) Date of Patent: *May 6, 2014

(54) METHOD OF GRAVEL PACKING

(75) Inventors: Trevor Hughes, Cambridge (GB);
Evgeny Barmatov, Cambridge (GB);
Jill Geddes, Cambridge (GB); Michael Fuller, Houston, TX (US); Bruno Drochon, Cambridge (GB); Sergey Makarychev-Mikhailov, St. Petersburg (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 235 days.

This patent is subject to a terminal disclaimer.

(21) Appl. No.: 12/868,188

(22) Filed: Aug. 25, 2010

(65) Prior Publication Data

US 2012/0048547 A1    Mar. 1, 2012

(51) Int. Cl.
*E21B 43/04* (2006.01)
*E21B 43/27* (2006.01)

(52) U.S. Cl.
USPC .................. 166/278; 166/305.1; 166/300

(58) Field of Classification Search
None
See application file for complete search history.

(56) References Cited

U.S. PATENT DOCUMENTS

| | | |
|---|---|---|
| 2,729,426 A | 1/1956 | Smith |
| 2,729,469 A | 1/1956 | Wilson |
| 3,462,242 A | 8/1969 | Barker et al. |
| 3,850,247 A | 11/1974 | Tinsley |
| 3,951,824 A | 4/1976 | Maxson et al. |
| 4,439,328 A | 3/1984 | Moity |
| 4,493,875 A | 1/1985 | Beck et al. |
| 4,547,468 A | 10/1985 | Jones et al. |
| 4,553,595 A | 11/1985 | Huang et al. |
| 4,600,057 A | 7/1986 | Borchardt |
| 4,611,664 A | 9/1986 | Osterhoudt, III et al. |
| 4,623,783 A | 11/1986 | Kondo |
| 4,657,784 A | 4/1987 | Olson |
| 4,767,549 A | 8/1988 | McEwen et al. |
| 4,986,354 A | 1/1991 | Cantu et al. |
| 5,040,601 A | 8/1991 | Karlsson et al. |
| 5,368,051 A | 11/1994 | Dunn et al. |

(Continued)

FOREIGN PATENT DOCUMENTS

| | | |
|---|---|---|
| CA | 1071076 | 2/1980 |
| WO | 9322537 | 11/1993 |

(Continued)

OTHER PUBLICATIONS

Braggs et al: "The Effect of Surface Modification by an Organosilane on the Electrochemical Properties of Kaolinite"; Clays and Clay Minerals, v. 42, No. 2, 1994, 123-136.

(Continued)

*Primary Examiner* — Angela M DiTrani (57) ABSTRACT

Gravel packing a region of a wellbore is carried out using one or more hydrophobically-surfaced particulate materials as the gravel. Placing the gravel pack is carried out using an aqueous carrier liquid, with hydrophobic particulate material suspended in the liquid and a gas to wet the surface of the particles and bind them together as agglomerates. The presence of gas lowers the density of the agglomerates relative to the particulate material in them, so that transport of the particulates is improved. The invention enables the placing of longer, uniformly packed, gravel packs, especially in horizontal and near horizontal wellbores.

19 Claims, 3 Drawing Sheets

(56) References Cited

U.S. PATENT DOCUMENTS

| | | | |
|---|---|---|---|
| 5,401,719 A | 3/1995 | DeBeer | |
| 5,439,057 A | 8/1995 | Weaver et al. | |
| 5,505,740 A | 4/1996 | Kong et al. | |
| 5,658,881 A | 8/1997 | Gelland et al. | |
| 5,680,900 A | 10/1997 | Nguyen et al. | |
| 5,716,923 A | 2/1998 | MacBeath | |
| 5,910,322 A | 6/1999 | Rivett et al. | |
| 5,922,652 A | 7/1999 | Kowalski et al. | |
| 6,156,808 A | 12/2000 | Chatterji et al. | |
| 6,176,537 B1 | 1/2001 | Doshi | |
| 6,253,851 B1 * | 7/2001 | Schroeder et al. | 166/278 |
| 6,372,678 B1 * | 4/2002 | Youngman et al. | 501/128 |
| 6,655,475 B1 | 12/2003 | Wald | |
| 6,684,760 B1 | 2/2004 | Rajusth | |
| 6,725,929 B2 | 4/2004 | Bissonnette et al. | |
| 6,725,931 B2 | 4/2004 | Nguyen et al. | |
| 6,774,094 B2 | 8/2004 | Jovancicevic et al. | |
| 6,776,235 B1 | 8/2004 | England | |
| 6,814,145 B2 | 11/2004 | Maberry et al. | |
| 6,884,760 B1 | 4/2005 | Brand et al. | |
| 7,017,664 B2 | 3/2006 | Walker et al. | |
| 7,036,585 B2 | 5/2006 | Zhou et al. | |
| 7,160,844 B2 | 1/2007 | Urbanek | |
| 7,166,560 B2 | 1/2007 | Still et al. | |
| 7,204,312 B2 | 4/2007 | Roddy et al. | |
| 7,210,528 B1 | 5/2007 | Brannon et al. | |
| 7,213,651 B2 | 5/2007 | Brannon et al. | |
| 7,219,731 B2 | 5/2007 | Sullivan et al. | |
| 7,228,912 B2 | 6/2007 | Patel et al. | |
| 7,273,104 B2 | 9/2007 | Wilkinson | |
| 7,281,580 B2 | 10/2007 | Parker et al. | |
| 7,281,581 B2 | 10/2007 | Nguyen et al. | |
| 7,287,586 B2 | 10/2007 | Everett et al. | |
| 7,287,588 B2 | 10/2007 | Zaroslov et al. | |
| 7,325,608 B2 | 2/2008 | van Batenburg et al. | |
| 7,331,390 B2 | 2/2008 | Eoff et al. | |
| 7,380,600 B2 | 6/2008 | Willberg et al. | |
| 7,380,601 B2 | 6/2008 | Willberg et al. | |
| 7,392,847 B2 | 7/2008 | Gatlin et al. | |
| 7,407,007 B2 | 8/2008 | Tibbles | |
| 7,417,504 B2 | 8/2008 | Strydom et al. | |
| 7,419,737 B2 | 9/2008 | Oh et al. | |
| 7,461,696 B2 | 12/2008 | Nguyen et al. | |
| 7,472,751 B2 | 1/2009 | Brannon et al. | |
| 7,484,564 B2 | 2/2009 | Welton et al. | |
| 7,491,444 B2 | 2/2009 | Smith et al. | |
| 7,581,780 B2 | 9/2009 | Shimamura et al. | |
| 7,665,522 B2 | 2/2010 | Sullivan et al. | |
| 7,723,274 B2 | 5/2010 | Zhang | |
| 7,765,522 B2 | 7/2010 | Banavar et al. | |
| 7,918,277 B2 | 4/2011 | Brannon et al. | |
| 7,919,183 B2 * | 4/2011 | McDaniel et al. | 428/402 |
| 7,921,911 B2 | 4/2011 | Fuller et al. | |
| 8,127,850 B2 | 3/2012 | Brannon et al. | |
| 8,448,706 B2 | 5/2013 | Hughes et al. | |
| 8,459,353 B2 | 6/2013 | Hughes et al. | |
| 2004/0014607 A1 | 1/2004 | Sinclair et al. | |
| 2004/0055747 A1 | 3/2004 | Lee | |
| 2004/0238173 A1 | 12/2004 | Bissonnette et al. | |
| 2005/0096207 A1 | 5/2005 | Urbanek | |
| 2005/0167104 A1 | 8/2005 | Roddy et al. | |
| 2005/0244641 A1 | 11/2005 | Vincent | |
| 2005/0274517 A1 | 12/2005 | Blauch et al. | |
| 2006/0016598 A1 | 1/2006 | Urbanek | |
| 2006/0048943 A1 | 3/2006 | Parker et al. | |
| 2006/0054324 A1 | 3/2006 | Sullivan et al. | |
| 2006/0166838 A1 | 7/2006 | Collins et al. | |
| 2007/0015669 A1 * | 1/2007 | Zhang | 507/200 |
| 2007/0044965 A1 | 3/2007 | Middaugh et al. | |
| 2008/0000638 A1 | 1/2008 | Burukhin et al. | |
| 2008/0023203 A1 | 1/2008 | Steiner | |
| 2008/0032898 A1 | 2/2008 | Brannon et al. | |
| 2008/0135242 A1 | 6/2008 | Lesko et al. | |
| 2008/0156498 A1 | 7/2008 | Phi et al. | |
| 2008/0217010 A1 | 9/2008 | Blackburn et al. | |
| 2008/0277115 A1 | 11/2008 | Rediger et al. | |
| 2008/0296204 A1 | 12/2008 | Venkateshan | |
| 2009/0038797 A1 | 2/2009 | Skala et al. | |
| 2009/0107674 A1 | 4/2009 | Brannon et al. | |
| 2009/0137433 A1 | 5/2009 | Smith et al. | |
| 2009/0188718 A1 | 7/2009 | Kaageson-Loe et al. | |
| 2010/0018709 A1 | 1/2010 | Parlar et al. | |
| 2010/0163234 A1 | 7/2010 | Fuller et al. | |
| 2010/0256024 A1 | 10/2010 | Zhang | |
| 2010/0267593 A1 | 10/2010 | Zhang | |
| 2011/0011589 A1 | 1/2011 | Zhang et al. | |
| 2011/0100634 A1 | 5/2011 | Williamson | |
| 2011/0180260 A1 | 7/2011 | Brannon et al. | |
| 2011/0204071 A1 | 8/2011 | Plumlee et al. | |
| 2012/0048554 A1 | 3/2012 | Hughes et al. | |
| 2012/0048555 A1 | 3/2012 | Hughes et al. | |
| 2012/0048557 A1 | 3/2012 | Hughes et al. | |
| 2012/0067584 A1 | 3/2012 | Zhang et al. | |
| 2012/0071371 A1 | 3/2012 | Zhang | |
| 2012/0267105 A1 | 10/2012 | Zhang | |
| 2012/0267112 A1 | 10/2012 | Zhang et al. | |

FOREIGN PATENT DOCUMENTS

| | | |
|---|---|---|
| WO | WO0212674 A1 | 2/2002 |
| WO | WO03106809 A1 | 12/2003 |
| WO | WO2004083600 A1 | 9/2004 |
| WO | WO2005100007 A1 | 10/2005 |
| WO | 2006116868 | 11/2006 |
| WO | WO2007086771 A1 | 8/2007 |
| WO | WO2008068645 A1 | 6/2008 |
| WO | WO2008102122 A1 | 8/2008 |
| WO | 2008124919 | 10/2008 |
| WO | WO2008124919 A1 | 10/2008 |
| WO | 2008135540 | 11/2008 |
| WO | WO2008131540 A1 | 11/2008 |
| WO | 2008151447 | 12/2008 |
| WO | WO2008151447 A1 | 12/2008 |
| WO | 2009009886 | 1/2009 |
| WO | WO2009009886 A1 | 1/2009 |
| WO | WO2009076080 A1 | 6/2009 |
| WO | WO2009143998 A1 | 12/2009 |

OTHER PUBLICATIONS

Cipola et al: "Resolving created, propped, and Effective Hydraulic Fracture length"; IPTC paper 12147 Dec. 2008.

Pineda et al: "Wash Pipe or no Wash Pipe? That is the Question"; Offshore technology Conference paper OTC16051 May 2004.

Brannon et al: "Large-Scale Laboratory Investigation of the Effects of Proppant and Fracturing-Fluid Properties on Transport"; SPE paper 98005; Feb. 2006.

Bulova et al: "Benefits of the Novel Fiber-laden Low-Viscosity Fluid System in Fracturing Low-Permeability Tight Gas Formations" SPE paper 102956 Sep. 2006.

Dayan et al: "Proppant Transport in Slick-Water Fracturing of Shale-Gas Formations"; SPE paper 125068 Oct. 2009.

Guo et al: "Simulation and Evaluation of Frac and Pack(F&P) Completion in High Permeability Formations"; Petroleum Society: Canadian Institute of Mining, Metallurgy & Petroleum PETSOC paper 2001-055.

Johansson et al: "Adsorption of silane coupling agents onto kaolinite surfaces"; Clay Minerals, v. 34, No. 2, 1999, 239-246.

Rickards et al: High Strength, Ultra-Lightweight Proppant Lends new Dimensiions to Hydraulic Fracturing Applications; SPE paper 84308; Oct. 2003.

Schein et al: "Ultra Lightweight proppants: Their Use and Application in the Barnett Shale"; SPE Paper 90838; Sep. 2004.

Hunter et al: "Effect of esterically bonded agents on the monolayer structure and foamability of nanosilica", Colloids and Surfaces A: Physicochemical and Engineering Aspects, vol. 334, 2009, pp. 181-190.

Ishida et al: "A Fourier-Transform Infrared Spectroscopic Study of the Hydrolytic Stability of Silane Coupling Agents on E-Glass Fibers"; Journal of Polymer Science, v. 18, 1980, 1931-1943.

(56) References Cited

OTHER PUBLICATIONS

Kawashima et al: "Some experiments on the effect of contact angle in agglomeration from liquids", Industrial and Engineering Chemistry Fundamentals, vol. 19, 1980, pp. 312-314.

Kundert et al: "Proper evaluation of shale gas reservoirs leads to a more effective hydraulic-fracture stimulation", 2009 SPE Rocky Mountain Petroleum Technology Conference, Denver, Colorado, USA, Apr. 14-16, 2009; SPE Paper 123586.

Kusaka et al: "Two-liquid flotation of fine oxide particles with B-hydroxyquinoline", The Canadian Journal of Chemical Engineering, vol. 77, Feb. 1999, pp. 62-68.

Laskowski et al: "Oil agglomeration and its effect on beneficiation and filtration of low-rank/oxidized coals", International Journal of Mineral Processing, vol. 58, 2000, pp. 237-252.

Liu et al: "Fundamental study of reactive oily-bubble flotation", Minerals Engineering, vol. 15, 2002, pp. 667-676.

Lowell, S.: "Continuous Flow Krypton Adsorption for Low Surface Area Measurements"; Analytical Chemistry, v. 45, No. 8, 1973, 1576-1577.

Marcinko et al: "Hydrolytic Stability of Organic Monolayers Supported on TiO2 and ZrO2"; Langmuir, 2004, v. 20, 2270-2273.

McElwee et al: "Thermal stability of organic monolayers chemically grafted to minerals"; Journal of Colloid and Interface Science, v. 285, 2005,551-556.

McGovern et al: "Role of Solvent on the Silanization of Glass with Octadecyltrichlorosilane"; Langmuir, v. 10, 1994, 3607-3614.

Mehrotra et al: "Review of oil agglomeration techniques for processing of fine coals", International Journal of Mineral Processing, vol. 11, 1983, pp. 175-201.

Mirji, S.A.: "Adsorption of octadecyltrichlorosilane on Si(1 0 0)/SiO2 and SBA-15"; Colloids and Surfaces A: Physicochem. Eng. Aspects, v. 289, 2006, 133-140.

Miwa et al: "Effects of the Surface Roughness on Sliding Angles of Water Droplets on Superhydrophobic Surfaces"; Langmuir 2000, 16, 5754-5760.

Nosonovsky et al:"Superhydrophobic surfaces and emerging applications: Non-adhesion, energy, green engineering"; Current Opinion in Colloid & Interface Science 14 (2009) 270-280.

Owen: "Why silicones behave funny", Dow Coming Corporation, pp. 1-11, 2005, form No. 01-3078-01.

Owen: "The surface activity of silicones: A short review", Industrial and Engineering Chemistry Product Research and Development, vol. 19, 1980, pp. 97-103.

Ozkan et al: "Comparison of stages in oil agglomeration process of quartz with sodium oleate in the presence of Ca (II) and Mg(II) ions", Journal of Colloid and Interface Science, vol. 329, 2009, pp. 81-88.

Ozkani: "Determination of the critical surface tension of wetting of minerals treated with surfactants by shear flocculation approach", Journal of Colloid and Interface Science, vol. 277, 2004, pp. 437-442.

Parikh et al: "An Intrinsic Relationship between Molecular Structure in Self-Assembled n-Alkylsiloxane Monolayers and Deposition Temperature"; Journal of Physical Chemistry, v. 98, 1994, 7577-7590.

Parker et al: "Bubbles, Cavities, and the Long-Ranged Attraction between Hydrophobic Surfaces"; J. Phys. Chem. 1994,98, pp. 8468-8480.

Qun et al: "The study and application of low-damage and massive hydraulic fracturing technique in tight gas formations with high temperature and high pressure", CIPC/SPE Gas Technology Symposium 2008 Joint Conference, Calgary, Alberta, Canada, Jun. 16-19, 2008; SPE Paper 114303.

Radice et al: "Spectroscopic behaviour, bond properties and charge distribution in methoxy groups in hydrofluoroethers: the effect of neighbouring CF2 group"; Journal of Molecular Structure, Theochem, v. 710, 2004, 151-162.

Rome et al: "Silicone in the oil and gas industry", Dow Corning Corporation, Sep. 2002, ref. No. 26-1139-01.

Rossetti et al: "Rupture energy and wetting behavior of pendular liquid bridges in relation to the spherical agglomeration process", Journal of Colloid and Interface Science, vol. 261 , 2003, pp. 161-169.

Rye, R R: "Transition Temperatures for n-Alkyltrichlorosilane Monolayers"; Langmuir, v. 13, 1997, 2588-2590.

Silberzan et al: "Silanation of silica surfaces. A new method of constructing pure or mixed monolayers", Langmuir, vol. 7, 1991, pp. 1647-1651.

"Sneh et al: ""Thermal Stability of Hydroxyl Groups on a Well-Defined Silica Surface""; Journal of Physical Chemistry, v. 99, 1995, 4639-4647."

Sonmez et al: "Fundamental aspects of spherical oil agglomeration of calcite", Colloids and Surfaces A: Physicochemical and Engineering Aspects, vol. 225, 2003, pp. 111-118.

Srinivasan et al: "Effect of surface coverage on the conformation and mobility of C18-modified silica gels"; Analytical and Bioanalytical Chemistry, v. 384, 2006,514-524.

Starck et al: "Simple method for controlled association of colloidal-particle mixtures using pH-dependent hydrogen bonding", Langmuir, vol. 25, 2009, pp. 21 14-2120.

Su et al: "Role of oily bubbles in enhancing bitumen flotation", Minerals Engineering, vol. 19, 2006, pp. 641-650.

Trican Well Service: "Lightening the Load"; New Technology Magazine Jan./Feb. 2010 pp. 43-44.

Wang et al: "Effects of Silanol Density, Distribution, and Hydration State of Fumed Silica on the Formation of Self-Assembled Monolayers of n-Octadecyltrichlorosilane"; Langmuir, v. 16, 2000, 5008-5016.

Wang et al: "Packing and Thermal Stability of Polyoctadecylsiloxane Compared with Octadecylsilane Monolayers" Langmuir, v. 16, 2000, 6298-6305.

Wheelock et al: "The role of air in oil agglomeration of coal at a moderate shear rate", Fuel, vol. 73, No. 7, 1994, pp. 1103-1107.

Yanazawa et al: "Precision Evaluation in Kr Adsorption for Small BET Surface Area Measurements of Less Than 1 m2"; Adsorption, v. 6, 2000, 73-77.

Ballistreri et al: "Mechanism of Thermal Degradation of Polyurethanes Investigated by Direct Pyrolysis in the Mass Spectrometer"; Journal of Polymer Science: Polymer Chemistry Edition, vol. 18,1923-1931 (1980).

Jones et al: "Alternate Path Gravel Packing"; SPE paper 22796, Oct. 1991.

Chen et al: "Gravel Packing Deep Water Long Horizontal Wells Under Low Fracture Gradient"; SPE Paper 90552 Sep. 2004.

Jones et al: "Gravel Packing Horizontal Wellbores with Leak-Off Using Shunts"; SPE paper 38640 Oct. 1997.

Ledoux et al "Infrared Study of the OH Groups in Expanded Kaolinite"; Science 17, v. 143, No. 3603, 1964, 224-246.

Morishige et al: "X-ray Diffraction Study of Kr, N2, and H2O Adsorbed on Pyrogenic Silica"; Langmuir, v. 17, 2001, 7291-7295.

Marques et al: "The 200th Horizontal Openhole Gravel-Packing Operation in Campos Basin: A Milestone in the History of Petrobras Completion Practices in Ultradeep Waters"; SPE Paper 106364, Oct. 1997.

"Pedroso et al:""Lightweight Proppants: Solution for Gravel Packing Horizontal Wells Under Extreme Conditions"""; SPE Paper 98298, Feb. 2006".

Pedroso et al: "New Solutions to Extend the Application Window of Horizontal Openhole Gravel Pack"; SPE Paper 96257 Oct. 2005.

Schlumberger Quantum Perfpac Brochure 2004.

Schlumberger OptiPac Brochure 2007.

Schlumberger AquaPac Brochure 2007.

Tolan et al: "Gravel Packing Long Openhole Intervals With Viscous Fluids Utilizing High Gravel Concentrations: Toe-to-Heel Packing Without the Need for Alternate Flow Paths"; SPE paper121912 Aug. 2009.

Welling et al: "Conventional High Rate Well Completions: Limitations of Frac&Pack, High Rate Water Pack and Open Hole Gravel Pack Completions"; SPE Paper 39475 Feb. 1998.

Ojo et al: "Factors Affecting Horizontal Well Gravel Pack Efficiency" Journal of Canadian Petroleum Technology vol. 47 (No. 12) pp. 50-54 Dec. 2008.

(56) References Cited

OTHER PUBLICATIONS

American Petroleum Institute: "Recommended practices for testing high-strength proppants used in hydraulic fracturing operations", API Recommended Practice 60, Second Edition, Dec. 1995, pp. 1-15.

American Petroleum Institute: "Recommended practices for testing sand used in hydraulic fracturing operations", API Recommended Practice 56, Second Edition, Dec. 1995, pp. 1-12.

Armistead et al: "Reactions of Chloromethyl Silanes with Hydrated Aerosil Silicas"; Transactions of the Faraday Society, v. 63, 1967, 2549-2556.

Arukhe et al: "Solutions for better production in tight gas reservoirs through hydraulic fracturing", 2009 SPE Western Regional Meeting, San Jose, California, USA, 24-2B Mar. 2009; SPE Paper 121357.

Aylmore, L. A. G.: "Gas Sorption in Clay Mineral Sysytems"; Clays and Clay Minerals, v. 22, 1974, 175-183.

Beebe et al: "The Determination of Small Surface Areas by Krypton Adsorption at Low Temperatures"; Journal of the American Chemical Society, v. 67, No. 9, 1554-1558 (1945).

Bereznitski etal:"Characterization of silica-based octyl phases of different bonding density Part I. Thermal stability studies"; Journal of ChromatographyA, v. 828, 1998, 51-58.

Brzoska et al: "Silanization of Solid Substrates: A Step Toward Reproducibility"; Langmuir, v. 10, 1994, 4367-4373.

Capel-Sanchez et al: "Silylation and surface properties of chemically grafted hydrophobic silica"; Journal of Colloid and Interface Science, v. 277, 2004, 146-153.

Capes et al: "A survey of oil agglomeration in wet fine coal processing", Powder Technology, vol. 40, 1984, pp. 43-52.

Chen et al: "Wetting Behaviors of Ethanol/Water on Rough PTFE Surface"; Acta Phys.-Chim. Sin., 2007, 23(8) pp. 1168-1172.

Chung et al: "Hydrophobic modification of silica nanoparticle by using aerosol spray reactor"; Colloids and Surfaces A: Physicochem. Eng. Aspects, v. 236, 2004, 73-79.

Dow Corning Corporation: "Silicone chemistry overview", product information leaflet, pp. 1-11, 1997, form No. 51-960A-97, Dow Corning Corporation, Midland, Michigan 48686-0994.

Drzymala et al: "Air agglomeration of hydrophobic particles", Paper presented at the 34th Annual Conference of Metallurgists, Vancouver, Canada, Aug. 19-24, 1995.

Duchet et al: "Influence of the deposition process on the structure of grafted alkylsilane layers", Langmuir vol. 1997, pp. 2271-2278.

Fadeev et al: "Self-Assembly Is Not the Only Reaction Possible between Alkyltrichlorosilanes and Surfaces:☐Monomolecular and ligomeric Covalently Attached Layers of Dichloro- and Trichloroalkylsilanes on Silicon"; Langmuir, v. 16, 2000, 7268-7274.

Fox et al: "The spreading of liquids on low energy surfaces. I. Polytetrafluoroethylene", Naval Research Laboratory, Washington DC, Journal of Colloid Science, vol. 5, 1950, pp. 514-531.

Fuller et al: "Diffuse Reflectance Measurements by Infrared Fourier Transform Spectrometry"; Analytical Chemistry, v. 50, No. 13, 1978, 1906-1910.

Gauthier et al: "Study of Grafted Silane Molecules on Silica Surface with an Atomic Force Microscope"; Langmuir, v. 12, 1996, 5126-5137.

Gussoni et al: "Infrared intensities. Use of the CH-stretching band intensity as a tool for evaluating the acidity of hydrogen atoms in hydrocarbons"; Journal of Molecular Structure, v. 521, 2000, 1-18.

Smith, "Lightening the Load," New Technology Magazine, Jan./Feb. 2010: pp. 43-44.

\* cited by examiner

METHOD OF GRAVEL PACKING

FIELD OF THE INVENTION

This invention relates to gravel packing a wellbore. Gravel packing is a process of placing a volume of particulate material, frequently a coarse sand, within the wellbore and possibly extending slightly into the surrounding formation. Generally the gravel pack is positioned intermediately between the formation and a production tube leading to the surface so that liquid and/or gas from the formation flows through the gravel pack and then enters the production tube through apertures provided for that purpose. A sand screen, consisting for instance of a metal mesh, may be provided between the gravel pack and the production tube.

The gravel pack acts as a filter for fine particles so that they are not entrained in the produced fluid. A gravel pack may be placed in a cased wellbore or in an open-hole wellbore. In the latter case the gravel pack may serve to reinforce the wellbore by preventing the formation from collapsing into the bore.

BACKGROUND OF THE INVENTION

A gravel pack is put in place by a procedure using a carrier liquid in which the particulate material is suspended. The carrier liquid is usually aqueous. Typically the carrier liquid with suspended material in it is pumped into the space around a sand screen. The carrier liquid flows into the production tube through apertures provided for that purpose and returns towards the surface but particulate material cannot pass through a sand screen or small apertures giving access to the production tube and is retained as a pack in the wellbore outside the production tube. Some of the carrier liquid may leak off into the formation around the wellbore, either through perforations in the casing or directly into the formation if the bore is an open hole without casing. A gravel pack may be put in place as part of the operation of completing a wellbore for production.

Although a gravel pack is envisaged primarily as a component of a wellbore with the pack located within the drilled borehole, it is possible for a gravel pack to extend somewhat into the formation around the wellbore. This will happen when a gravel pack is put in place after perforation of the wellbore casing. In this event the gravel pack will occupy an annulus of the wellbore around the production tube and may also extend into the perforations through the casing and into the formation.

A gravel pack also extends into the surrounding formation when the so-called "frac and pack" process is used. In this process a fracturing treatment is carried out, generally on a small scale so as to produce small fractures, followed by placing a gravel pack which extends into the fractures as well as occupying the annulus around the production tube. Literature discussion of the frac and pack process can be found for instance in PETSOC 2001-055 which is a paper of the Petroleum Society of the Canadian Institute of Mining, Metallurgy & Petroleum. In this frac and pack process the pack is transported into place using a carrier liquid. Some of the liquid carries particulate material into the fractures and then leaks off into the formation while some of the liquid enters the production tube and returns towards the surface.

A variety of forms of apparatus may be utilized for delivering the carrier liquid and suspended solid to the location where the gravel pack is required and a variety of carrier liquids may also be employed, but the suspended particulate material generally has a specific gravity which is higher than that of the carrier liquid and so the particulate material will tend to settle out. This settling out of the particulate material can cause, or exacerbate, blockages and/or incomplete packing of the volume which it is desired to fill with the particulate material.

There have been two approaches to the formulation of the carrier liquid. One approach includes a viscosity-enhancing thickening agent in the liquid, which retards settling of solid materials. Guar and other polysaccharides have been widely used for this purpose. Chemically modified polysaccharides and viscoelastic surfactants have also been used. An alternative is to use a low viscosity carrier liquid. This considerably reduces the energy required in pumping but keeping particulate material in suspension becomes much more difficult and a higher pump flow rate is commonly used so that shear and turbulence keep the particulate solid in suspension for transport. Society of Petroleum Engineers paper SPE38640 mentions that both types of fluid are in use and references a number of papers discussing the relative strengths and weaknesses of the different fluids.

Sand, which has a specific gravity of 2.65, is widely used as the particulate material for gravel packs. Material of lower specific gravity has been used and is mentioned in SPE 38640. Subsequent papers, including SPE98298 and SPE106364 describe the placing of gravel packs in horizontal wellbores using lightweight materials which are also known for use as lightweight proppants in fractures. The lightweight material referred to in these papers is based on comminuted walnut hulls to which a resin coating has been applied. It has a specific gravity of 1.25. Lightweight particulate materials tend to be associated with lower strength than sand. In the context of a gravel pack this may not be an issue but strength is required in a frac and pack procedure where some material must act as proppant for the fractures.

SUMMARY OF THE INVENTION

This invention provides a method of gravel packing a region of a wellbore, comprising supplying to that region of the wellbore a fluid composition comprising an aqueous carrier liquid, hydrophobic particulate material suspended in the carrier liquid and gas to wet the surface of the particles and bind them together as agglomerates.

Agglomeration of the particulate material by the gas is reversible, and may be reversed or prevented when the composition is subjected to shear. A fluid composition which is pumped downhole is subjected to varying amounts of shear in the course of its journey down the wellbore. Consequently the agglomeration of the particulate material may take place after the fluid composition has travelled some way down the wellbore towards the region where the gravel pack will be placed, or may even be delayed until the composition reaches that region.

The presence of gas in the agglomerates of the particulate material reduces their density relative to the density of the solid material in them and in consequence they settle less rapidly within the carrier liquid and can be transported more easily. This in turn is beneficial in that it may be possible to create a longer gravel pack or it may be possible to increase the amount of particulate material relative to the volume of carrier liquid and thus pump less aqueous liquid into the region to be gravel packed (an advantage if the process of gravel packing is bringing water into contact with a water-sensitive formation).

The particulate material may be sand (or some other mineral or ceramic having a similar specific gravity) to which a hydrophobic surface treatment has been applied. In such a case the agglomeration with gas will reduce the density and speed of settling so that the agglomerates will be transported like a lighter weight material. However, we have found that the amount of gas which can be incorporated in agglomerates has a maximum, constrained by geometry of the particulate material, and so it is to be expected that agglomerates of hydrophobically modified sand or similarly dense material will have a density which is greater than that of the carrier liquid and will settle although at a reduced rate.

Another possibility is that the particulate material is less dense than sand, perhaps having a specific gravity in a range 1.2 to 1.9. Agglomeration with gas will then create agglomerates with even lower density giving an opportunity to form agglomerates which have a density close to that of the carrier liquid or are buoyant and float in the carrier liquid.

A further possibility is to employ a mixture of hydrophobic particulate materials having different densities. Thus the hydrophobic particulate material may comprise first and second hydrophobic particulate materials where the first of these materials has a higher specific gravity than a second material. The first material may be a material which is desired to use a for a gravel pack, for instance a hydrophobically modified sand, while the second particulate material aids transport by reducing the density of the agglomerates and so assists suspension in the carrier fluid. The agglomerates will contain both the denser first particles and the lighter second particles. The density of the agglomerates will be reduced, both by the presence of lighter particles and by the presence of gas. We have found that by using a mixture of particulate materials it is possible to form agglomerates which include sand (or other particulate material of similar density) and yet have a density as low as, or below, that of the carrier liquid.

When a particulate material is made lighter by means of adsorbed gas, that gas will be compressed by the increasing hydrostatic pressure as it is pumped downhole. Consequently, the volume of gas which must be supplied at the surface, in order to provide a desired volume of gas downhole, may be large.

When both lighter and denser particulates are agglomerated with gas, not only can the overall density of the particulates be lower than would be achievable without the lighter particulate material but also a smaller volume of gas may be required in order to achieve the desired reduction of density under downhole hydrostatic pressure.

Fluid gravel-packing compositions may be formulated such that the resulting agglomerates have a density not exceeding 1.4 g/ml and preferably not exceeding 1.1 g/ml. In some embodiments of this invention agglomerates are at or close to neutral buoyancy or are light enough to float in the carrier liquid and do not settle.

When a mixture of hydrophobic particles of differing densities is used, the first, denser particulate material may have a specific gravity of 1.8 or above, possibly at least 2.0 or 2.5, although it is also possible that the first particulate material could be a lightweight material such as material with specific gravity in a range from 1.5 or 1.6 up to 1.8. The second, lighter hydrophobic particulate material may have a specific gravity less than 1.5 and preferably less than 1.3. The second particulate material may possibly have a specific gravity not greater than 1.0. The amounts of the first and second particulate materials may be such that they have a ratio by volume in a range from 5:1 to 1:5, possibly 4:1 to 1:4 and possibly 3:1 to 1:4.

To avoid misunderstanding, it should be appreciated that a figure quoted in the literature for the density of a particulate material is sometimes a bulk density which is the mean density of a quantity of the particulate material together with anything present in the interstitial spaces between particles. (On this basis, wet sand has a higher density than dry sand because the bulk density includes water between particles of sand). By contrast, herein, specific gravity of a particulate material refers to the specific gravity of the particles themselves, without considering interstitial material. For individual particles specific gravity is the weight of a particle relative to the weight of an equal volume of water. This is true if the particles are formed of a homogenous material, an inhomogenous material or even if they are hollow.

Particulate materials used in this invention may be inherently hydrophobic or may be particles which are hydrophilic but have a hydrophobic coating on their surface. For instance, ordinary silica sand is hydrophilic and is not agglomerated by oil or gas in the presence of water. By contrast, we have found that sand which has been surface treated to make it more hydrophobic will spontaneously agglomerate in the presence of oil, air or nitrogen gas.

A quantitative indication of the surface polarity of a solid (prepared with a smooth, flat surface) is the concept of critical surface tension pioneered by Zisman (see Fox and Zisman J. Colloid Science Vol 5 (1950) pp 514-531 at page 529). It is a value of surface tension such that liquids having a surface tension against air which is lower than or equal to this value will spread on the surface of the solid whereas those of higher surface tension will remain as droplets on the surface, having a contact angle which is greater than zero. A strongly hydrophobic solid has a low critical surface tension. For instance the literature quotes a critical surface tension for polytetrafluoroethylene (PTFE) of 18.5 mN/m and for a solid coated with heptadecafluoro-1,1,2,2-tetra-hydro-decyl-trichlorosilane the literature value of critical surface tension is 12 mN/m. By contrast the literature values of critical surface tension for soda-lime glass and for silica are 47 and 78 mN/m respectively.

We have found that an analogous measurement of the hydrophobicity of the surface of a particulate solid can be made by shaking the solid with a very hydrophobic oil (preferably a silicone oil) having a low surface tension and mixtures of ethanol and water with a progressively increasing proportion of ethanol. This may be done at a room temperature of 20° C. The surface tensions of a number of ethanol and water mixtures are tabulated in CRC Handbook of Chemistry and Physics, $86^{th}$ edition, section 6 page 131.

Increasing the proportion of ethanol in the aqueous phase (i.e. the ethanol and water mixture) reduces its surface tension. Eventually a point is reached when the surface tension of the aqueous phase is so low that the solid can no longer be agglomerated by the oil. The boundary value at which agglomeration by the oil ceases to occur is a measure of the hydrophobicity of the solid and will be referred to as its "agglomeration limit surface tension" or ALST.

We have observed that particulate solids which can undergo spontaneous aggregation from suspension in deionised water on contact with oil always display an ALST value of approximately 40 mN/m or less. This ALST test covers a range of values of practical interest, but it should be appreciated that if no agglomeration takes place, this test does not give a numerical ALST value, but demonstrates that the surface does not have an ALST value of 40 mN/m or less. Moreover, if the surface has an ALST value below the surface tension of pure ethanol (22.4 mN/m at 20° C.), this test will not give a numerical ALST value but will show that the ALST value is not above 22.4 mN/m.

When particulate materials to be agglomerated are not inherently hydrophobic, a range of different methods can be used to modify the surface of solid particles to become more hydrophobic—these include the following, in which the first three methods provide covalent bonding of the coating to the substrate.

Organo-silanes can be used to attach hydrophobic organo-groups to hydroxyl-functionalized mineral substrates such as proppants composed of silica, silicates and alumino-silicates. The use of organosilanes with one or more functional groups (for example amino, epoxy, acyloxy, methoxy, ethoxy or chloro) to apply a hydrophobic organic layer to silica is well known. The reaction may be carried out in an organic solvent or in the vapour phase (see for example Duchet et al, Langmuir (1997) vol 13 pp 2271-78).

Organo-titanates and organo-zirconates such as disclosed in U.S. Pat. No. 4,623,783 can also be used. The literature indicates that organo-titanates can be used to modify minerals without surface hydroxyl groups, which could extend the range of materials to undergo surface modification, for instance to include carbonates and sulphates.

A polycondensation process can be used to apply a polysiloxane coating containing organo-functionalized ligand groups of general formula P—$(CH_2)_3$—X where P is a three-dimensional silica-like network and X is an organo-functional group. The process involves hydrolytic polycondensation of a tetraalkoxysilane $Si(OR)_4$ and a trialkoxysilane $(RO)_3Si(CH_2)_3X$. Such coatings have the advantage that they can be prepared with different molar ratios of $Si(OR)_4$ and $(RO)_3Si(CH_2)_3X$ providing "tunable" control of the hydrophobicity of the treated surface.

A fluidized bed coating process can be used to apply a hydrophobic coating to a particulate solid substrate. The coating material would typically be applied as a solution in an organic solvent and the solvent then evaporated within the fluidized bed.

Adsorption methods can be used to attach a hydrophobic coating on a mineral substrate. A surfactant monolayer can be used to change the wettability of a mineral surface from water-wet to oil-wet. Hydrophobically modified polymers can also be attached by adsorption.

The surface modification processes above may be carried out as a separate chemical process before the gravel packing operation is commenced. Such pretreatment of solid material to make it hydrophobic would not necessarily be carried out at the well site; indeed it may be done at an industrial facility elsewhere and the pretreated material shipped to the well site. However, it is also possible that some of the above processes, especially an adsorption process, could be carried out at the well site as part of the mixing of the fluid composition which is pumped to the region where the gravel pack is required.

When a mixture of particulate materials is employed, either or both of them may be inherently hydrophobic. However, available hydrophobic materials tend to be lighter and thus more suitable as the second particulate material. Thus, one possibility is that the denser first particulate material is a solid mineral material such as sand with a hydrophobic coating on the exterior of the particles while the second, lighter, particles are an inherently hydrophobic material. Possible materials are natural or synthetic rubbers and hydrophobic polymers such as polyethylene and polypropylene. Polymers may be partially crosslinked or may contain strengthening fillers. For the sake of economy, hydrophobic materials may be materials which are being recycled after a previous use, for example comminuted recycled motor tyres or comminuted recycled polypropylene packaging. Other candidate materials are particles of coal or coal fractions.

The second, lighter, particles may be hollow. Glass microspheres with a hydrophobic coating are one possibility. We have found that such microspheres can remain intact under significant hydrostatic pressure.

A range of glass microspheres (with a hydrophilic glass surface) are commercially available. Suppliers include 3M Inc and other manufacturers. Available microspheres have specific gravity ranging from 0.125 to 0.6 and the crush strength of such particles increases with their specific gravity. For example microspheres are available with a $d_{50}$ median particle size of 40 micron, a specific gravity of 0.38 and crush strength able to withstand pressures up to 4000 psi (27.58 MPa). Microspheres are also available with $d_{50}$ of 40 micron, a specific gravity of 0.6 and crush strength able to withstand pressures up to 10000 psi (68.95 MPa). Commercially available hydrophilic glass spheres can be made hydrophobic by a surface coating applied by one of the methods mentioned above.

The second particulate material may be a porous solid, such as volcanic pumice, with a hydrophobic coating. Such a material will have light weight because of the air filled pores: the aqueous carrier liquid will not invade these pores because of their small diameter and the hydrophobic coating.

Another candidate for a small size second particulate material is hydrophobically modified hollow spheres, where the hollow spheres (also termed cenospheres) are extracted from flyash. (So called flyash is recovered from the flue gas of coal fired power plants, and is a small particle size material with a high silica content. Cenospheres which form spontaneously in the combustion process are a small percentage of flyash).

The solid particles used in this invention may vary somewhat in shape and size. They may have irregular shapes typical of sand grains which can be loosely described as "more spherical than elongate" where the aspect ratio between the longest dimension and the shortest dimension orthogonal to it might be 5 or less or even 2 or less. Other shapes such as cylinders or cubes are possible, notably if the particles are a manufactured ceramic product. In general, median particle sizes are unlikely to be larger than 5 mm. Median particle sizes are more likely to be 3 mm or less and possibly or less.

Particle sizes may conveniently be specified by reference to sieve sizes, as in American Petroleum Institute Recommended Practices (API RP) standards. Another method for determining size of particles is the commonly used technique of low angle laser light scattering, more commonly known as laser diffraction. Instruments for carrying out this technique are available from a number of suppliers including Malvern Instruments Ltd., Malvern, UK. The Malvern Mastersizer is a well known instrument which determines the volumes of individual particles, from which mean and median particle size can be calculated using computer software which accompanies the instrument. When determining particle sizes using such an instrument, the size of an individual particle is reported as the diameter of a spherical particle of the same volume, the so-called "equivalent sphere". Volume median diameter denoted as D[v,05] or $d_{50}$ is a value of particle size such that 50% (by volume) of the particles have a volume larger than the volume of a sphere of diameter $d_{50}$ and 50% of the particles have a volume smaller than the volume of a sphere of diameter $d_{50}$. Particle sizes determined by low angle laser light scattering are similar to particle sizes determined by sieving if the particles are approximately spherical.

If a mixture of particulate materials is used, it is possible that the second, lighter, material has smaller particle size than the first, denser material. This could lead to the second particles fitting into interstices between first particles and reducing the permeability of the pack which is formed. However, this would not be a disadvantage if the second particles were formed from a material which degraded over time, or dissolved in oil passing through the gravel pack. The second particulate material would then assist transportation and placing of the second gravel pack, but would disappear from the gravel pack after it had been put in place.

The agglomerating agent which binds the particles together as agglomerates is a gas. This gas must be sufficiently hydrophobic to form a phase which does not dissolve in the aqueous carrier liquid, although it is possible for it to have some limited water solubility, as is the case with air and with nitrogen. As mentioned above the amount of gas which can be retained in agglomerates has an upper limit. We have found that agglomeration by gas may be assisted and improved if a small amount of hydrophobic oil is present. However, the amount should be small, such as not more than 10% or not more than 5% by volume of the amount of gas downhole, and perhaps less than 1% by volume of the amount of gas at the surface. If the amount of oil is larger, agglomeration occurs but the oil displaces gas from the agglomerates and so the amount of gas which can be held by agglomerates is reduced.

The aqueous carrier liquid which is used to transport the particles may be of a kind conventionally used for placing a gravel pack. It may be a formulation which is substantially free of viscosity-enhancing polymeric thickener and having a viscosity which is not much greater than water, for instance not more than 15 centipoise, which is about 15 times the viscosity of water, when viscosity is measured at 20° C. and a shear rate of 100 $sec^{-1}$. Such a formulation may be a water or a salt solution containing at least one polymer which acts as a friction reducer. A combination of polymers may be used for this purpose. Polymers which are frequently used and referred to as "polyacrylamide" are homopolymers or copolymers of acrylamide. Incorporation of a copolymer can serve to give the "modified" polyacrylamide some ionic character. A polyacrylamide may considered a copolymer if it contains more than 0.1% by weight of other comonomers. Mixtures of homopolymers and copolymers may be used. Copolymers may include two or more different comonomers and may be random or block copolymers. The comonomers may include, for example, sodium acrylate. The polyacrylamide polymers and copolymers useful as friction reducers may include those having an average molecular weight of from about 1000 up to about 20 million, or possibly above, with from about 1 million to about 5 million being typical. Other suitable friction reducers may be used as well; for example vinyl sulfonates included in poly(2-acrylamido-2-methyl-1-propanesulfonic acid) also referred to as polyAMPS.

The polyacrylamide may be present in the carrier liquid in an amount of from about 0.001% to about 5% by weight of the liquid but the amount is frequently not over 1% or even 0.5% by weight by weight. In many applications, the polyacrylamide is used in an amount of from about 0.01% to about 0.3% by weight of the fluid. The polyacrylamide may be initially dissolved or dispersed as a concentrate in mineral oil or other liquid carrier to enhance the delivery or mixability prior to its addition to water or a salt solution to make the carrier liquid.

Alternatively, carrier liquid may incorporate a thickening agent to increase the viscosity of the fluid. Such a thickening agent may be a polymer. It may be a polysaccharide such as guar, xanthan or diutan or a chemically modified polysaccharide derivative such as hydroxyalkylcellulose or a hydroxyalkylguar. These polysaccharide thickeners may be used without cross linking or may be cross-linked to raise viscosity further. Viscosity of a thickened carrier liquid may be at least 100 centipoise at 20° C. and a shear rate of 100 $sec^{-1}$. We have observed that some thickening of the carrier liquid does not prevent agglomeration, although it may be preferred that the viscosity is not allowed to become too high before agglomeration takes place.

Gravel packing a region of a wellbore will usually be carried out by supplying the fluid composition comprising the carrier liquid, the particulate materials and the gas to a region surrounding a perforated screen located within the wellbore so that the particulate material is retained in that region while at least some of the carrier liquid passes through the screen and returns towards the surface. The region may lie wholly within the cross section of the wellbore, or may extend outwardly into the formation at perforations or (in a frac and pack process) into fractures in the formation.

The invention may be utilized when forming a gravel pack in a region of the wellbore which is deviated from the vertical to such an extent that the axis of the region of the wellbore where the gravel pack is placed is at less than 40°, possibly less than 30° to the horizontal. It is in such near-horizontal wellbore regions that premature settling of particulate material is an obstacle to placing a long gravel pack.

The method of this invention may be utilized for forming an entire gravel pack from hydrophobic particulate material. However, in a development of the concept, a gravel pack may be formed with a combination of a hydrophilic particulate material which does not agglomerate and a hydrophobic material as required for this invention. The hydrophilic material may then form the lower part of a gravel pack in a conventional manner, while the agglomerates formed in accordance with this invention become the upper part of the gravel pack. Hydrophilic particulate material might be pumped in first to form the lower part of the gravel pack, followed by the hydrophobic material and gas required for the present invention. Alternatively, the hydrophilic and hydrophobic materials might be delivered concurrently.

Agglomerates of hydrophobic particles and a gas as agglomerating agent will form spontaneously in an aqueous carrier liquid when the materials are mixed together. One possibility is that the particulate materials, carrier liquid and agglomerating gas are all mixed together at the surface and then pumped down a wellbore. In this case the particles may agglomerate before passing through the pumps. If so, they may be sheared apart by the pumps, but spontaneously reform downstream from the pumps as they pass down the wellbore.

A possibility to avoid passing the agglomerates through the pumps is that the gas is compressed at the surface and then admitted to the high pressure flowline downstream of the surface pumps which are driving the carrier liquid and the particulate materials into the wellbore. As a variant of this, the gas could be transported down the wellbore in a separate pipe so as to travel to a considerable depth underground before mixing with the particulate materials.

Another approach is to allow the materials to mix, but inhibit agglomeration for at least part of the journey of the carrier liquid and entrained materials to the subterranean location where the agglomerates are required. To do this the hydrophobic particulate materials may be coated with a hydrophobic material which is removed or chemically degraded under conditions encountered downhole. Degradation may in particular be hydrolysis of a surface coating. While such hydrolytic degradation may commence before the overall composition has travelled down the wellbore to the reservoir, it will provide a delay before contact between agglomerating gas and exposed hydrophobic surface becomes significant.

DETAILED DESCRIPTION AND EXAMPLES

In the following examples, Examples 1 to 4 illustrate the preparation of hydrophobically modified materials. Examples 5 to 10 show the agglomeration of hydrophobic particulate materials, in accordance with this invention.

Example 1

Hydrophobic Modification of Sand

Sand, having particle size between 20 and 40 US mesh (840 micron and 400 micron), i.e. 20/40 sand, was washed by mixing with ethanol at ambient temperature, then filtering, washing with deionised water and drying overnight at 80° C.

Quantities of this pre-washed sand were hydrophobically modified by treatment with various reactive organosilanes, using the following procedure. 75 gm pre-washed sand was added to a mixture of 200 ml toluene, 4 ml organo-silane and 2 ml triethylamine in 500 ml round bottomed flask. The mixture was refluxed under a nitrogen atmosphere for 4 to 6 hours. After cooling, the hydrophobically modified sand (hm-sand) was filtered off (on a Whatman glass microfiber GF-A filter) and then washed, first with 200 ml toluene, then 200 ml ethanol and then 800 ml deionised water. The hm-sand was then dried overnight at 80° C.

The above procedure was carried out using each of the following four reactive organo-silanes:

5.64 gm Heptadecafluoro-1,1,2,2-tetrahydro-decyl-triethoxysilane (>95% purity, specific gravity=1.41 gm/ml).

5.40 gm Tridecafluoro-1,1,2,2-tetrahydro-octyl-triethoxysilane (>95% purity, specific gravity=1.35 gm/ml).

3.53 gm Octadecyl-trimethoxysilane (90% purity, specific gravity=0.883 gm/ml).

5.93 gm Octadecyldimethyl 3-trimethoxysilylpropyl ammonium chloride (60% active solution in methanol, specific gravity=0.89 gm/ml).

For convenience the hydrophobic groups introduced by these materials will be referred to hereafter as $C_{10}F_{17}H_4$-silyl, $C_8F_{13}H_4$ silyl, $C_{18}H_{37}$-silyl and $C_{18}H_{37}$aminopropylsilyl, respectively.

It was appreciated that these quantities of organo-silane were far in excess of the stoichiometric amount required to react with all the hydroxyl groups on the surface of the sand particles. 20/40 sand has specific surface area 0.0092 m$^2$/gm (calculated from particle size distribution determined by laser diffraction (Malvern Mastersizer) method). The theoretical maximum concentration of hydroxyl (—OH) groups per unit area of silica surface, is 4.5 hydroxyl groups per square nanometer. From these values it can be calculated that 75 gm sand has (at most) $3.1 \times 10^{18}$ hydroxyl groups exposed on its surface. Using Avogadro's number, 5.64 gm (0.00924 mol) heptadecafluoro-1,1,2,2-tetra-hydro-decyl-triethoxysilane contains $5.56 \times 10^{21}$ molecules. Therefore there is a very high ratio of organo-silane molecules in the reaction solution to surface hydroxyl groups. The calculated number ratio in the case of the $C_{10}F_{17}H_4$-silyl example above was organo-silane$_{(solution)}$/OH$_{(surface)}$=1792. It should be noted that excess oprganosilane is removed from the treated sand during the filtration and washing stages.

Example 2

The procedure above was carried out with the following reduced quantities of organo-silane:

0.27 gm Heptadecafluoro-1,1,2,2-tetra-hydro-decyl-triethoxysilane number ratio organo-silane$_{(solution)}$/OH$_{(surface)}$=85.8.

0.02 gm Heptadecafluoro-1,1,2,2-tetra-hydro-decyl-triethoxysilane number ratio organo-silane$_{(solution)}$/OH$_{(surface)}$=6.4.

It was found the smallest amount of organo-silane was insufficient to render the sand adequately hydrophobic to be agglomerated.

Example 3

Condensation Coating

Pre-washed 20/40 sand, prewashed as in Example 1 above, was given a hydrophobic surface coating by the simultaneous condensation polymerization of tetraethylorthosilicate (TEOS) and tridecafluoro-1,1,2,2-tetrahydro-octyl-triethoxysilane in 3:1 molar ratio under basic conditions.

200 gm pre-washed sand, 12 ml of aqueous ammonia (NH$_4$OH, 28%), 57 ml of absolute ethanol and 3 ml deionized water were mixed and stirred vigorously (Heidolph mechanical stirrer at 300-400 RPM) for 30 min. Then 0.73 gm (3.53 mmol) of TEOS and 0.6 gm (1.17 mmol) tridecafluoro-1,1,2,2-tetrahydro-octyl-triethoxysilane were added and stirred for 3.5 hrs at room temperature. The resulting hm-sand was then filtered off, washed with ethanol and then with deionized water and dried at 120° C. overnight.

This procedure was also carried out using pre-washed 70/140 sand with a mixture of tetraethylorthosilicate (TEOS) and heptadecafluoro-1,1,2,2-tetra-hydro-decyl-triethoxysilane.

Example 4

Condensation Coating of Glass Microspheres

The glass microspheres used had a mean diameter d$_{50}$ of 40 micron and a specific gravity of 0.6. 20 gm microspheres, 12 ml of aqueous ammonia (NH$_4$OH, 28%), 57 ml of absolute ethanol and 3 ml deionized water were mixed and stirred vigorously (Heidolph mechanical stirrer at 300-400 RPM) for 30 min. Then 0.73 gm (3.53 mmol) of TEOS and 0.6 gm (1.17 mmol) tridecafluoro-1,1,2,2-tetrahydro-octyl-triethoxysilane were added and stirred for 4 hrs at room temperature. The resulting hm-microspheres were then filtered off, washed with ethanol and then with deionized water and dried at 120° C. overnight.

Example 5

Agglomeration of hm-Sand and Polypropylene

A sample mixtures was prepared using 2 gm 20/40 sand, hydrophobically modified with tridecafluoro-1,1,2,2-tetrahydro-octyl-triethoxysilane as in Example 3. This was mixed with 16 ml of deionised water in a bottle of about 30 ml capacity, thus leaving an air-filled headspace of about 10-15 ml in the bottle. The bottle was closed and shaken vigorously so that the solids could be agglomerated with air from the headspace.

A single agglomerate with a smoothly curved surface was formed. This demonstrated that hydrophobically modified 20/40 sand could be agglomerated with air. However, the agglomerate sank to the bottom of the bottle and no change was achieved through further shaking. Since the amount of air in the headspace was larger than the agglomerate formed, it was apparent that the amount of air in the agglomerate had reached the maximum which the agglomerate could retain, indicating that the amount of air which could be retained in the agglomerate was not a sufficiently large volume fraction to give an agglomerate of neutral buoyancy.

The agglomerate in the sample bottle was visually estimated to approximate to a sphere of 1.5 cm diameter and hence have a volume of slightly over 1.5 ml. The sand, having a specific gravity of 2.65 was calculated to occupy a volume of 0.75 ml and so the gas content was slightly above 50% of the agglomerate. Thus the bulk density of the agglomerate would be slightly under 1.32 gm/ml.

An agglomerate of 2 gm of 70/140 hydrophobically modified sand was made in the same way as above and stored at 80° C. for three months. At the end of this period the sand was still agglomerated indicating that the hydrophobising pretreatment and the agglomeration were both stable under these conditions.

Example 6

Agglomeration of hm-Sand and Polypropylene

Sample mixtures were prepared using 20/40 sand, hydrophobically modified with tridecafluoro-1,1,2,2-tetrahydro-octyl-triethoxysilane as in Example 3 and varying proportions of 20/40 polypropylene particles, having a specific gravity of 0.9. The amounts are given in the following table which also includes the result from Example 5 above:

| Sample number | $C_8F_{13}H_4$- sand 20/40 | Polypropylene 20/40 | Volume fraction polypropylene |
|---|---|---|---|
| 1 (Example 5) | 2 g | none | 0 |
| 2 | 2 g | 0.2 g | 0.23 |
| 3 | 2 g | 0.4 g | 0.37 |
| 4 | 2 g | 0.6 g | 0.47 |
| 5 | 2 g | 1.0 g | 0.6 |

Each sample was mixed with 16 ml of deionised water in a bottle of about 30 ml capacity, thus leaving an air-filled headspace of about 10-15 ml in the bottle. The bottle was closed and shaken vigorously so that the solids could be agglomerated with air from the headspace.

In the case of samples 2 and 3 with 0.2 g or 0.4 g polypropylene present the agglomerates again sank to the bottom of the bottle but were less firmly settled than the agglomerate without polypropylene, indicating that the polypropylene in the agglomerates together with the gas in them was reducing the density compared with the agglomerate without polypropylene. With 0.6 g or 1 g polypropylene present reduction of density went further and some of the agglomerates floated to the top of the water in the bottles.

In a subsequent experiment nitrogen was bubbled into the bottles near the bottom of each one. Nearly all of the agglomerates formed from sample 4 with 0.6 g polypropylene present floated in the water. In the case of sample 5 with 1.0 g polypropylene present, all the agglomerates floated in the water.

This experiment was repeated with the modification that five drops of dodecane were added to the samples before nitrogen was bubbled into the bottom of each bottle. Yet again the sample without polypropylene formed a single agglomerate which sank. The agglomerates from samples 4 and 5, with 0.6 g and 1 g polypropylene present all floated. This indicates that a small amount of oil, occupying only a small volume fraction, increases the efficacy in reducing the density of agglomerates.

Example 7

The previous example was repeated using the same, hydrophobically modified 20/40 sand but using smaller polypropylene particles all of which passed a 40 mesh sieve. After shaking the closed bottles where some polypropylene was present, slightly more of the agglomerates floated than in the previous example. After bubbling in nitrogen, for the samples with 0.4 g, 0.6 g and 1.0 g polypropylene present, all the agglomerates floated at the top of the water in the bottles. This indicates that the smaller polypropylene particles assisted the reduction in density of the agglomerates formed.

Example 8

Agglomeration of hm-Sand and hm-Microspheres

Samples were prepared using varying proportions of 20/40 sand, hydrophobically modified with tridecafluoro-1,1,2,2-tetrahydro-octyl-triethoxysilane as in Example 3 and hydrophobically modified glass microspheres prepared as in Example 4. The amounts are given in the following table:

| | 20/40 hm-sand | | hm-microspheres | | Total vol. | |
|---|---|---|---|---|---|---|
| Sample No. | Wt (g) | Vol (ml) | Wt (g) | Vol (ml) | Solids (ml) | Vol % microspheres |
| 1 | 2 | 0.755 | 0 | 0 | 0.755 | |
| 2 | 1.5 | 0.566 | 0.113 | 0.189 | 0.755 | 25 |
| 3 | 1.0 | 0.377 | 0.226 | 0.377 | 0.754 | 50 |
| 4 | 0.5 | 0.189 | 0.340 | 0.566 | 0.755 | 75 |

Each sample was mixed with 20 ml of deionised water in a bottle of about 30 ml capacity, thus leaving an air-filled headspace in the bottle of 10 ml or more. The bottle was closed and shaken vigorously so that the solids could be agglomerated with air from the headspace.

In the case of the sample 1, without microspheres, a single agglomerate was formed, just as with sample 1 of Example 5. For all samples with microspheres present some agglomerates sank to the bottom of the bottle but were less firmly settled than the agglomerate without microspheres and some agglomerates floated to the top of the water in the bottles.

Next nitrogen was bubbled into the bottles near the bottom of each one. Almost all of the agglomerates formed from sample4 with 75 vol% microspheres floated in the water. In the case of sample 5 with 1.0 g polypropylene present, all the agglomerates floated in the water.

This experiment was repeated with the modification that five drops of dodecane were added to the samples before nitrogen was bubbled into the bottom of each bottle. Yet again the sample without microspheres formed a single agglomerate which sank. The agglomerates from samples 3 and 4, with 50 vol % and 75 vol % microspheres, all floated. This indicates that a small amount of oil, occupying only a small volume fraction, increases the efficacy of gas in reducing the density of agglomerates.

Example 9

A procedure similar to the previous example was carried out, replacing the 20/40 sand with 70/140 sand, hydrophobically modified with heptadecafluoro-1,1,2,2-tetrahydro-decyl-triethoxysilane as in Example 3. The amounts of materials were as set out in the following table:

| Sample No. | 20/40 hm-sand | | hm-microspheres | | Total vol. | |
|---|---|---|---|---|---|---|
| | Wt (g) | Vol (ml) | Wt (g) | Vol (ml) | Solids (ml) | Vol % microspheres |
| 1 | 2 | 0.755 | 0 | 0 | 0.755 | |
| 2 | 1.5 | 0.566 | 0.113 | 0.189 | 0.755 | 25 |
| 3 | 1.0 | 0.377 | 0.226 | 0.378 | 0.755 | 50 |

Each sample was mixed with 20 ml of deionised water in a bottle of about 30 ml capacity, thus leaving an air-filled headspace in the bottle of 10 ml or more. The bottle was closed and shaken vigorously so that the solids could be agglomerated with air from the headspace. As before, in the absence of glass microspheres the hm-sand forms an agglomerate which sinks in water. With 25 vol % microspheres, some agglomerates floated (a larger proportion than with 20/40 hm sand in the previous example) and with 50% microspheres almost all agglomerates floated.

A similar result was observed when nitrogen was bubbled into each bottle. The experiment was repeated with the modification that five drops of dodecane were added to the samples before nitrogen was bubbled into the bottom of each bottle. Yet again the sample without microspheres formed a single agglomerate which sank. With 25 vol % microspheres and again with 50 vol % microspheres all the agglomerates floated. This again indicates that a small amount of oil, occupying only a small volume fraction, increases the efficacy of gas in reducing the density of agglomerates.

As a control experiment, 0.5 g 70/140 hm-sand was mixed with 0.34 g of unmodified glass microspheres and 20 g deionised water. This quantity of microspheres amounts to 74 vol % of the solids. On shaking with air the unmodified glass microspheres did not agglomerate and floated at the surface of the water. The hm-sand formed an air agglomerate which sank to the base of the bottle.

Example 10

The procedure of Example 5 was repeated using polytetrafluoroethylene (ptfe) particles with a $d_{50}$ particle size of 100 micron and a specific gravity of 2.1. This material is of course inherently hydrophobic. After shaking the closed bottle, the agglomerates which formed floated to the top of the liquid in the bottle, indicating that their bulk density was less than 1 gm/ml.

Application of the Invention

Figure 1:
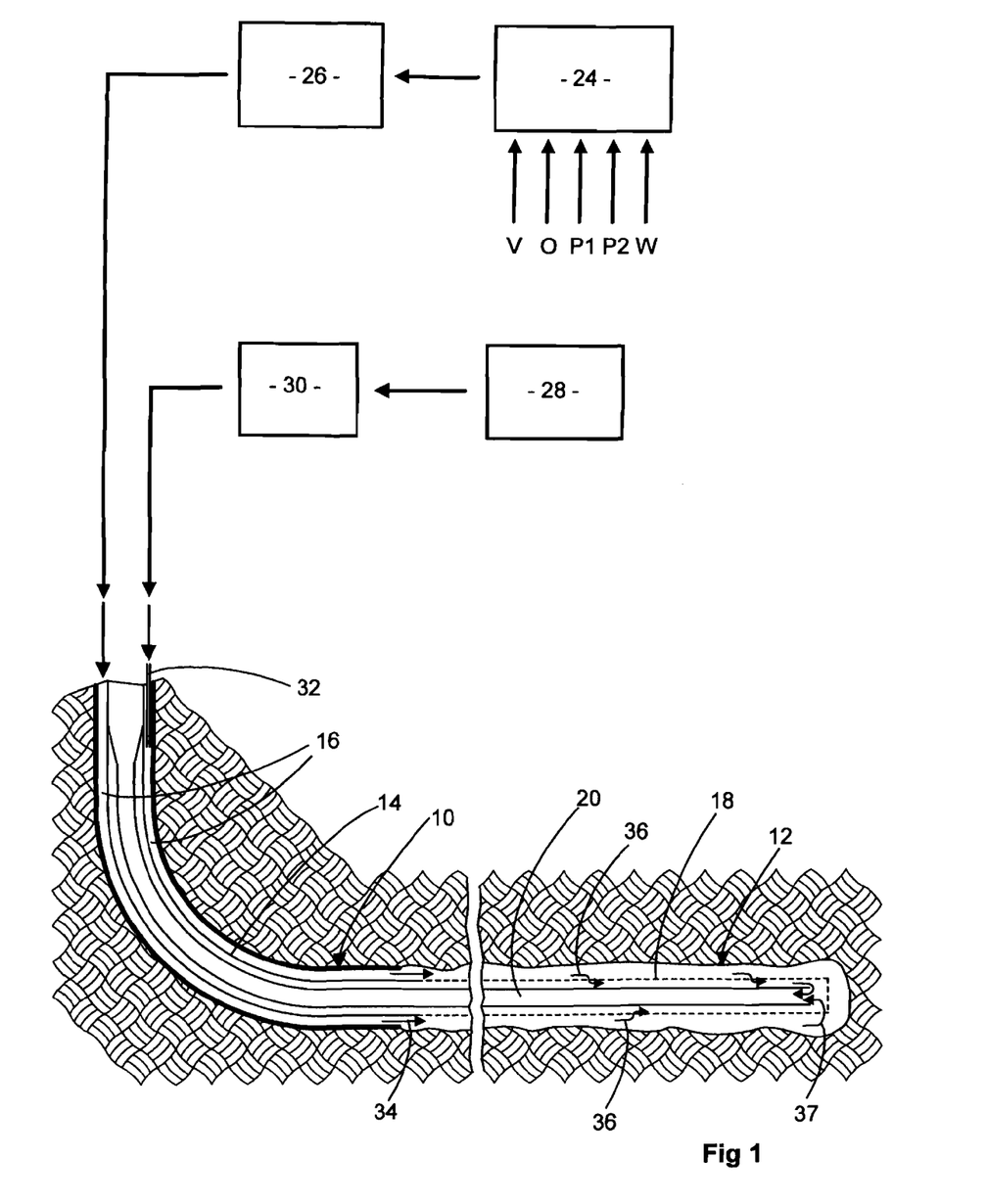
FIG. 1 illustrates the procedure of placing a gravel pack in a wellbore including a horizontal open hole section.

To illustrate and exemplify use of some embodiments of the method of this invention, FIG. 1 illustrates a conventional layout for gravel packing. A drilled wellbore is deviated to have a horizontal portion extending within a reservoir formation. The well bore is cased 10 as far as the horizontal portion. This portion remains as an open hole 12. Tubing 14 in the wellbore separates a path within the tubing 14 from an annulus 16 around it. The tubing 14 is continued within the horizontal open hole 12 by a sandscreen 18 which is perforated so as to allow gas or liquid to enter but prevents entry of particulate solids larger than a designated size. This sandscreen 18 may for example be constructed with metal mesh over inlet apertures, so as to prevent passage of particulate solids. In order to carry out gravel packing, a so-called washpipe 20 is located inside the screen 18 and extends almost to the end of the drilled bore. The objective, when gravel packing, is to pump particulate material into the annular cavity between the screen 18 and the drilled openhole 12, so that this cavity is completely filled with the particulate material.

In order to place a gravel pack in accordance with an embodiment of this invention, a mixer 24 is supplied with a small amount of viscosity reducing polymer, a small amount of oil, first and second hydrophobic particulate materials and water as indicated by arrows V, O P1, P2, and W. The mixer delivers a mixture of these materials to pumps 26 which pump the mixture under pressure down the wellbore. The mixture is pumped into the annulus 16 (although it may descend the wellbore inside a central tube and then pass through a crossover to enter the annulus 16). Nitrogen from a supply 28 pressurized by compressor 30 is driven down a small-bore tube 32 within the wellbore. This tube 32 exits into the annulus 16, where the nitrogen mixes with the particulate materials and forms agglomerates of them.

The aqueous carrier liquid and suspended agglomerates then flow along the annulus 16 as indicated by arrow 34. Once the suspension is within the cavity around the sandscreen 18, the carrier liquid but not the suspended particulate can pass through the screen 18 as indicated by arrows 36, 37. The direction of flow is towards the end of the wellbore where the carrier liquid enters the washpipe 20 and flows back towards the surface.

This pattern of flow of the carrier liquid and transported particulate material is conventional, but because the agglomerates have low density they either do not settle out of the carrier liquid, or else settle slowly, so that the carrier liquid is able to transport them to the end of the wellbore. As a result the creation of a pack of particulate material around the sandscreen starts at the end of the wellbore. The pack is progressively created from right to left (as viewed in FIG. 1).

Figure 2:
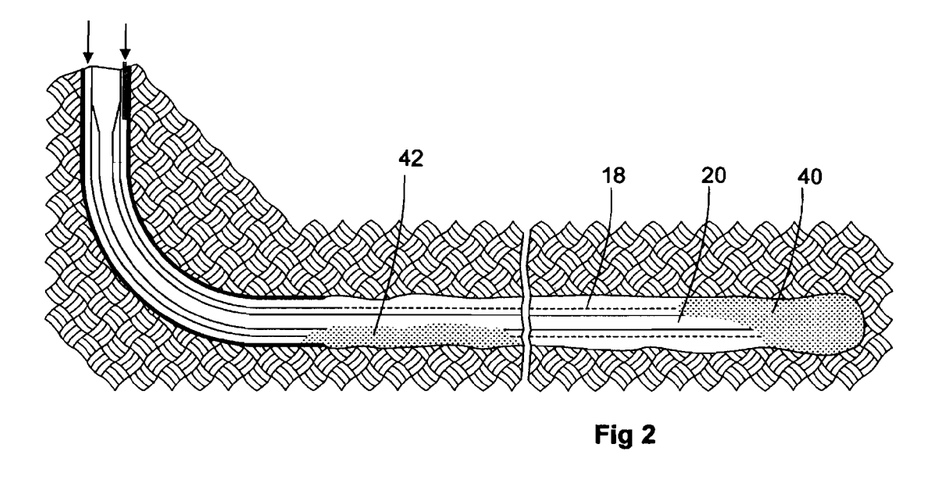
FIG. 2 shows the wellbore of FIG. 1 with mixed hydrophilic and hydrophobic materials being placed as a gravel pack.

FIG. 2 illustrates this, and also shows a modification. Formation of a pack (shown dotted) of agglomerates of the hydrophobic particulate materials at the end of the wellbore is indicated at 40. This pack will grow progressively from right to left as viewed in FIG. 2. However, for the sake of economy, some ordinary hydrophilic particulate material is also pumped in. This may be pumped in before the hydrophobic particulate material without pumping in nitrogen, or may be pumped in concurrently with hydrophobic particulate material and nitrogen. The hydrophilic material settles out and forms a bed 42 of packed material occupying the lower part of the annulus around the screen (like the alpha wave of conventional gravel packing) starting proximate the beginning of the screen 18 (the left hand end of the screen as seen in FIG. 2).

Figure 3:
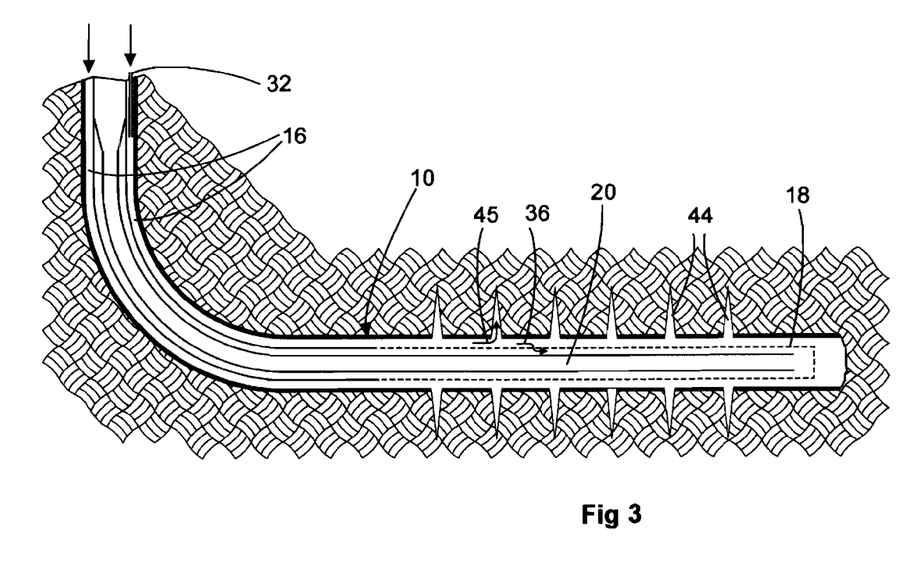
FIG. 3 illustrates the procedure of placing a gravel pack in a perforated, cased wellbore.

FIG. 3 illustrates another possibility. The wellbore has casing 10 throughout its length, and perforations 44 through the casing extend into the formation. Aqueous carrier liquid containing suspended hydrophobic particulate materials is pumped into the annulus 16 and agglomerated into lightweight agglomerates on mixing with nitrogen which has been supplied along tube 32 just as in the embodiment illustrated by FIG. 1.

The suspended agglomerates are carried into the space around the screen 18. Some of the suspended agglomerates are carried into the perforations, as indicated by arrow 45, by carrier liquid which leaks off into the formation, thus leaving the particulate material within the perforation. Other carrier liquid carries the agglomerates along the cavity around the screen 18. This carrier liquid passes through the screen 18 as indicated by arrow 36, leaving the particulate material in the cavity around the screen as described with reference to FIG. 1.

Figure 4:
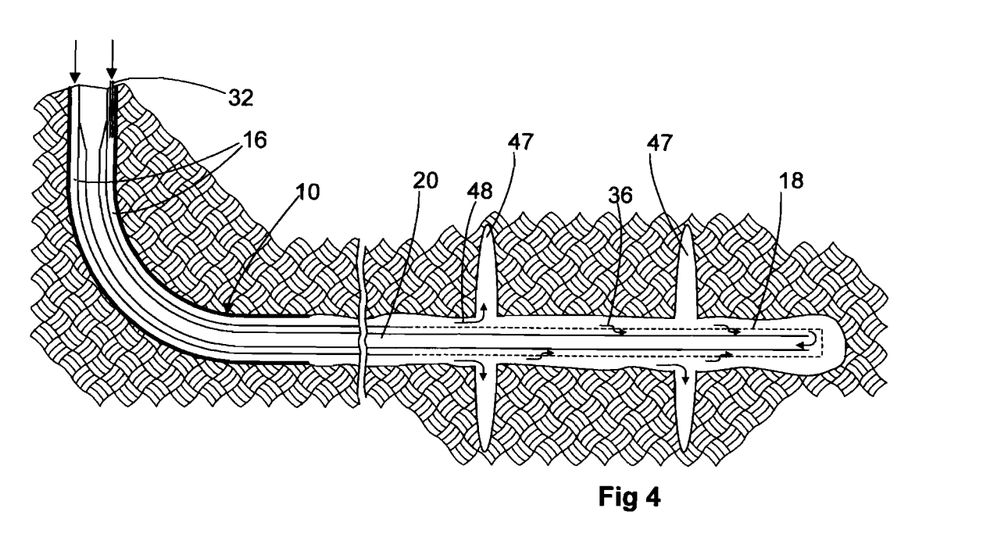
FIG. 4 illustrates a frac and pack procedure.

FIG. 4 illustrates a frac and pack process. The arrangement is very similar to FIG. 1 except that fractures 47 have been formed in the open hole by pumping in liquid without suspended solid. In order to put proppant in these and form a gravel pack around the screen 18 at the same time, aqueous carrier liquid with hydrophobic particulate material in it is pumped in just as in FIG. 1 and agglomerates are formed on contact with the nitrogen which is pumped in along tube 32. Some of the suspended agglomerates are carried into the fractures 47, as indicated by arrow 48, by carrier liquid which leaks off into the formation, thus leaving the particulate material as proppant within the fracture. Another part of the carrier liquid carries the agglomerates along the cavity around the screen 18. Some of this carrier liquid leaks off into the formation around the open hole wellbore and some passes through the screen 18 as indicated by arrow 36, leaving the particulate material in the cavity around the screen as described with reference to FIG. 1 and returning toward the surface along washpipe 20.

Figure 5:
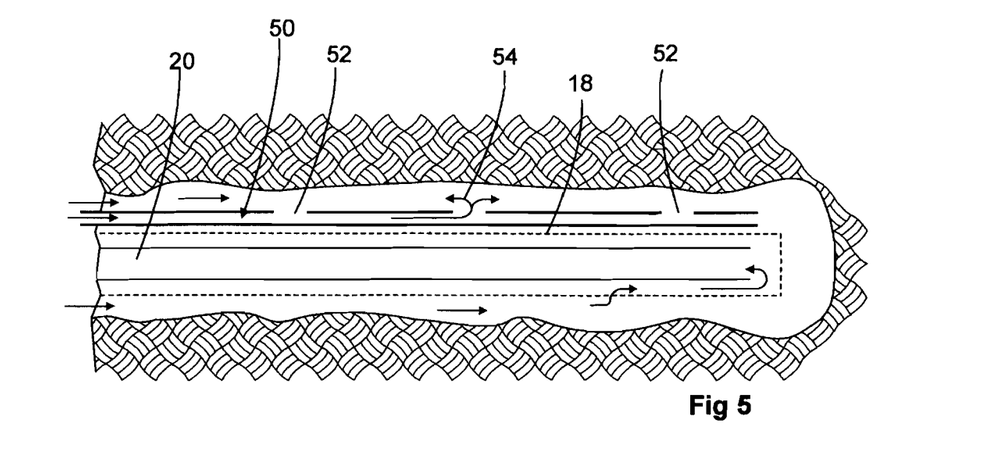
FIG. 5 illustrates the procedure of placing a gravel pack in a wellbore including a horizontal open hole section where a duct to provide an alternate path is present.

FIG. 5 shows another form of conventional construction for placing a gravel pack. Embodiments of this invention can be used with it. An additional duct 50 in the cavity provides a so-called alternate path. Agglomerates of particulate material and nitrogen gas are formed as in FIG. 1 and pumped into the annular cavity around screen 18, as indicated by the flow arrows. The carrier liquid conveys agglomerates within the duct 50 and outside it. Some carrier liquid will leak off into the formation and some liquid will pass through screen 18. The amount of liquid leaking off into the formation may vary from one place to another along the open hole and this creates a possibility that packing of material will take place at several points, with gaps between them. As a countermeasure against this possibility, the duct 50 has openings 52 along its length, and carrier liquid with suspended agglomerates can pass through an opening and flow in either or both directions, as illustrated by arrow 54. Such flow along the duct 50 and out through any or all of the openings 52 can fill gaps in the pack which forms, or prevent them from forming.

Figure 6:
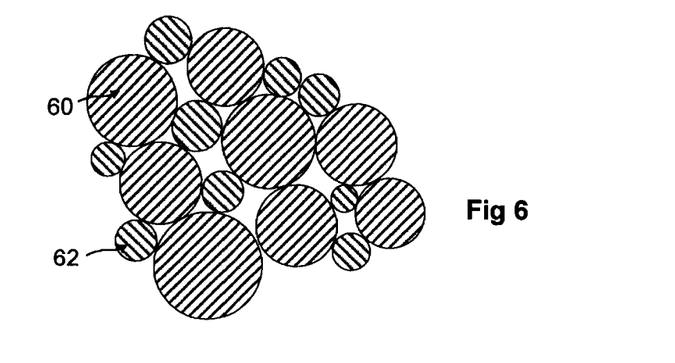
FIG. 6 diagrammatically illustrates part of an agglomerate.

The above embodiments are given by way of illustration, not limitation. The first particulate material supplied to the mixer 24 may be hydrophobically modified sand, while the second material may be polypropylene particles or hydrophobically modified glass spheres of similar size to the sand. AS mentioned earlier, where two particulate material are used they need mot be of the same size. FIG. 6 very diagrammatically illustrates part of an agglomerate of denser first particles 60 and second, less dense particles 62 which are of smaller size.

As an alternative, a single particulate material might be supplied to the mixer 24: if this was a hydrophobically modified lightweight material of specific gravity approximately 1.6, similar results would be obtained. If hydrophobically modified sand was used as the only particulate material, the agglomerates formed from it would have a bulk density lower than the density of sand grains and would be carried further along a horizontal wellbore than ordinary hydrophilic sand, thus giving an advantage over conventional sand even though the agglomerated particulate material would settle slowly.

The invention claimed is:

1. A method of gravel packing a region of a wellbore comprising supplying thereto a fluid comprising an aqueous carrier liquid, a mixture of first and second hydrophobic particulate materials suspended in the liquid where the first hydrophobic particles have a higher specific gravity than the second hydrophobic particles and a gas to wet the surfaces of the first and second particles and bind them together as agglomerates.

2. A method according to claim 1 wherein at least one particulate material comprises solid particles with a hydrophobic surface coating.

3. A method according to claim 1 wherein the first hydrophobic particles comprise solid particles with a hydrophobic surface coating and the second hydrophobic particles comprise solid particles of hydrophobic material.

4. A method according to claim 1 wherein the first particles have a specific gravity of at least 1.8 and the second particles have a specific gravity of less than 1.5.

5. A method according to claim 4 wherein the second particles have a specific gravity of less than 1.0.

6. A method according to claim 1 wherein the first and second hydrophobic particles are present in the fluid in proportions such that agglomerates of the first and second particles, containing the gas in the maximum amount which the agglomerates can retain, have a density of 1.1 or less.

7. A method according to claim 1 wherein the ratio of the first and second particles lies in a range from 4:1 to 1:4 by volume.

8. A method according to claim 1 wherein the first hydrophobic particles have a higher strength than the second hydrophobic particles.

9. A method according to claim 1 wherein the second particulate material comprises porous particles with a hydrophobic exterior.

10. A method according to claim 1 wherein the second particulate material comprises hollow particles with a hydrophobic exterior.

11. A method according to claim 10 wherein the second particulate material comprises hollow glass particles with a hydrophobic surface coating.

12. A method according to claim 1 wherein the aqueous carrier liquid is substantially free of viscosity-enhancing polymeric thickener and has a viscosity which is less than 15 centipoise when viscosities are measured at 20° C. and a shear rate of 100 $\sec^{-1}$.

13. A method according to claim 1 wherein the aqueous carrier liquid contains viscosity-enhancing thickener and has a viscosity which is at least 100 centipoise when viscosities are measured at 20° C. and a shear rate of 100 $\sec^{-1}$.

14. A method according to claim 1 which comprises supplying the fluid to a region surrounding a perforated tube located within the wellbore so that particulate material is retained in that region while at least some carrier liquid enters the tube and returns towards the surface within that tube.

15. A method according to claim 1 which comprises supplying the fluid to a region surrounding a perforated tube located within the wellbore and also to one or more fractures or perforations extending into the formation from the said region.

16. A method according to claim 1 which comprises supplying the fluid to a region within the wellbore and an axis of the region of the wellbore is at no more than 30 degrees to the horizontal.

17. A method of gravel packing a region of a wellbore comprising
  supplying a fluid to a region surrounding a perforated tube located within the wellbore, where the fluid comprises
    an aqueous carrier liquid,
      a mixture of first and second hydrophobic particulate materials suspended in the liquid where the first hydrophobic particles comprise sand with a hydrophobic coating thereon and have a specific gravity of at least 1.8, the second hydrophobic particles comprise a material other than sand and have a specific gravity of less than 1.5 and the ratio of the first and second particles lies in a range from 4:1 to 1:4 by volume,
      a gas to wet the surfaces of the first and second hydrophobic particles and bind them together as agglomerates,
  such that particulate material is retained in the region surrounding the perforated tube while at least some carrier liquid enters the tube and returns towards the surface within that tube.

18. A method according to claim 17 wherein the second hydrophobic particles are solid particles of hydrophobic material and the first hydrophobic particles have a higher strength than the second hydrophobic particles.

19. A method according to claim 17 wherein the second hydrophobic particles material comprise hollow glass particles with a hydrophobic surface coating.

\* \* \* \* \*